Sept. 11, 1928.
E. F. BLISS
1,684,256
CONTROL SYSTEM
Filed Aug. 14, 1924
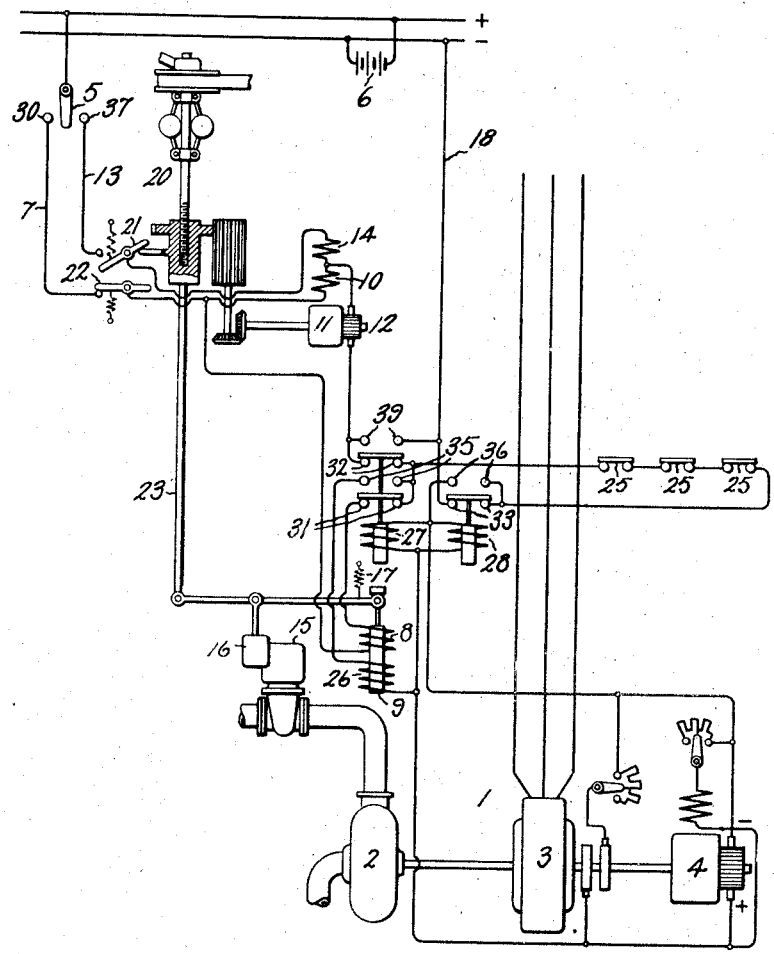
Inventor:
Elmer F. Bliss,
by Alexander F. [signature]
His Attorney.

Patented Sept. 11, 1928.

1,684,256

UNITED STATES PATENT OFFICE.

ELMER F. BLISS, OF ALPLAUS, NEW YORK, ASSIGNOR TO GENERAL ELECTRIC COMPANY, A CORPORATION OF NEW YORK.

CONTROL SYSTEM.

Application filed August 14, 1924. Serial No. 732,079.

My invention relates to control systems and particularly to systems for controlling automatic prime mover dynamo-electric plants.

Automatic switching equipments for controlling the operation of prime mover dynamo-electric plants are old and well-known in the art. Such equipments comprise a plurality of electroresponsive devices which are arranged to operate in a predetermined sequence to effect the operation of the plant automatically upon the occurrence of a predetermined condition either at the plant or at some remote point.

In order that the electroresponsive devices may be operated to effect the starting of the plant, when the plant is shut down, a separate source of current has to be provided for energizing the electroresponsive devices. This separate source may be either at the dynamo-electric plant or at some remote point which is connected to the plant by a control circuit. Sometimes it is desirable to control over this same control circuit some other condition of the plant than the starting thereof, such, for example, as the output of the plant after it has been started. In order that this additional control may be effected over the same control circuit that the starting thereof is effected, it is necessary to arrange the circuits of the electroresponsive devices of the automatic switching equipment so that they can be energized from some other source, such as the dynamo-electric machine of the prime mover dynamo-electric plant, after the plant has been started. One object of my invention is to provide a system of control whereby the electroresponsive devices of an automatic switching equipment for a prime mover dynamo-electric plant are energized independently of the separate source and the control circuit connecting the devices to the separate source as soon as there is a suitable voltage available at the plant for energizing the devices when the plant is started.

Another object of my invention is to provide in a system of remote control for an automatic prime mover dynamo-electric plant an arrangement whereby the same control circuit may be used to effect the starting of the plant from a remote point when the plant is shut down and to vary the output of the plant after it has been started.

My invention will be better understood from the following description, taken in connection with the accompanying drawing, which shows one embodiment of my invention, and its scope will be pointed out in the appended claims.

Referring to the drawing, 1 represents a prime mover dynamo-electric plant comprising a water-wheel 2, which drives a generator 3 and an exciter 4. As shown, the plant is arranged to be controlled from a distance, the starting and stopping of the plant being effected by means of a control switch 5 which may be located at any desired point. The switch 5 is arranged to connect one side of a separate source of current, shown as a battery 6, to a pilot wire 7 to which are connected the starting coil 8 of the governor magnet 9 and the field winding 10 and armature winding 11 of the synchronizing motor 12 and alternatively to a pilot wire 13 to which the field winding 14 and armature 11 of the synchronizing motor 12 are connected. The other side of the battery 6 is connected to the starting coil 8, and the windings of the motor 12 by means of the pilot wire 18 and various contacts which will be hereinafter described.

The governor magnet 9 is arranged in any suitable manner, examples of which are well-known in the art, so that when the magnet 9 is energized while the plant is shut down, the gate 15 which controls the supply of water to the water-wheel 2 is opened to effect the starting of the water-wheel, and when the magnet 9 is deenergized the gate 15 is closed to stop the water-wheel. As shown in the drawing, the magnet 9 when energized effects the operation of the pilot valve 16, which controls the operation of the gate 15 to effect the opening of the gate. This movement of the pilot valve is opposed by a spring 17 which moves the pilot valve 16 to effect the closing of the gate whenever the magnet 9 is deenergized.

20 is a speed governor which controls the position of the pilot valve in response to the speed of the plant. The governor 20 and magnet 9 are so arranged that the governor is operative to control the gate opening only when the magnet is energized.

The synchronizing motor 12 is arranged in any suitable manner, examples of which are well-known in the art whereby rotating the motor 12 in one direction varies the setting of the governor so that the output of the plant is increased and rotating the motor 12 in the opposite direction varies the setting of the governor so that the output of the plant is decreased. As shown in the drawing, the rotation of the motor 12 varies within limits determined by the limit switches 21 and 22, the length of the operating rod 23 of the governor 20. When the circuit through the field winding 10 of the motor 12 is completed the motor 12 operates in a direction to increase the output of the plant, and when the circuit through the field winding 14 is completed the motor 12 operates in a direction to decrease the output of the plant.

Since the electroresponsive devices of the automatic switching equipment for controlling the electrical connections of the generator and the exciter form no essential part of my invention and may be of any desirable type, examples of which are well-known in the art, these devices have been omitted in order to simplify the drawing.

In automatic switching equipments for prime mover dynamo-electric plants, it is customary to provide a plurality of protective devices which are arranged to effect the shutting down of the plant upon the occurrence of certain predetermined abnormal conditions. This result is usually accomplished by the protective devices operating contacts in the circuits of one or more of the electroresponsive devices of the automatic switching equipment, the contacts being arranged so that after being operated by the respective protective devices they have to be reset by hand before the automatic switching equipment can function again to effect the starting of the plant. In the drawing, the contacts 25 represent a plurality of such contacts which may be opened respectively by suitable means, not shown, when certain predetermined abnormal conditions occur. These contacts 25 are connected in the circuit of the coil 8 of the magnet 9 which is arranged to be closed by the control switch 5 so that in case any one of the contacts 25 has been opened, the circuit of the coil 8 cannot be completed until the contacts 25, which are open, have been reset manually. In this manner protection against starting after the occurrence of a predetermined abnormal condition is provided until the plant has been inspected.

In order to decrease the output of the plant 1 by means of the control switch 5, it is necessary to open the circuit through the pilot wire 7 and close the circuit through the pilot wire 13. In order to prevent the magnet 9 from being deenergized when the switch 5 is moved out of engagement with contact 30 the magnet 9 is arranged to be energized by the plant as soon as there is voltage available at the plant. As shown in the drawing, the magnet 9 is provided with a holding coil 26 which is connected across the exciter 4 by the exciter voltage relays 27 and 28, when the exciter voltage exceeds a predetermined value. The relays 27 and 28 are also arranged so that when they operate they open the circuit of the starting coil 8 and connect the contacts 25 of the protective devices in the circuit of the holding coil 26. Therefore if any one of the protective devices is operated while the plant is in operation the magnet 9 is deenergized to effect the shutting down of the plant.

While I have shown the magnet 9 as having two coils, one of which is energized to effect the starting of the plant and the other one of which is energized after the plant has reached a predetermined condition, which in the arrangement shown is the exciter voltage building up to a predetermined value, it is obvious to one skilled in the art that many other suitable arrangements may be used to effect the energization of the magnet 9 independently of the control circuit after the plant has been started. Therefore, I do not wish it to be understood that my invention is limited to the particular arrangement shown and described.

The operation of the arrangement shown is as follows: When the plant is shut down the control apparatus is in the position shown. When it is desired to start the plant the control switch 5 is operated so that it engages contact 30 thereby completing a circuit from the positive terminal of the battery 6 through the control switch 5, contact 30, pilot wire 7, limit switch 22, starting winding 8 of the governor magnet 9 and contacts 31 of the relay 27 which are in parallel with the field winding 10 and armature winding of the synchronizing motor 12 and the contacts 32 of the relay 27, all of the contacts 25 in series, contacts 33 of the relay 28, pilot wire 18 to the negative terminal of the battery 6. The motor 12 operates to increase the length of the rod 23 and the energization of the coil 8 pulls the plunger of the magnet 9 down. Both of these operations tend to move the plunger of the pilot valve downward thereby effecting the opening of gate 15. After the gates have been opened a small amount, the water-wheel starts and accelerates rapidly until substantially normal speed is reached, when the governor 20 operates, to move the pilot valve 16 so as to maintain the gate opening at the proper amount to hold the desired speed. Meanwhile, the electroresponsive devices (not shown) of the automatic switching equipment are functioning so as to establish the desired electrical connections of the plant.

As soon as the voltage of the exciter 4 builds up to a predetermined value, when the plant is started, the relays 27 and 28, which are connected across the exciter, operate to disconnect the starting coil 8 from the control circuit and to connect a circuit across the exciter which includes the holding coil 26 and all of the protective contacts 25. The circuit of the holding coil 26 is from the positive side of the exciter 4, through the holding coil 26 of the magnet 9, contacts 35 of the relay 27, all of the contacts 25 in series, contacts 36 of the relay 28 to the negative terminal of the exciter. The holding coil 26 therefore is energized independently of the control circuit 7 so that this control circuit 7 may be opened and the switch 5 moved so as to engage contact 37 to rotate the motor 12 in the opposite direction to decrease the output of the plant without deenergizing the magnet 9 and effecting the shutting down of the plant. In order that the motor 12 may be operated independently of the protective contacts 25 after the plant has been started, the relay 27 is provided with the contacts 39 which connect the armature winding 11 of the motor directly to the pilot wire 18.

After the plant has been started, the output may be varied to any desired value within predetermined limits by operating the motor 12 so as to vary the length of the governor rod 23.

When it is desired to shut the plant down the control switch 5 is moved into engagement with the contact 37 and left there so that the motor 12 will decrease the length of the rod 23 until the limit switch 21 in the circuit of the motor is opened.

The governor is so arranged that when the length of the governor rod 23 has been decreased this amount, the opening of the gate 15 is so small that the water-wheel rotates at such a very low speed that the holding coil 26 of the magnet 9 is not sufficiently energized to hold attracted the core of the magnet 9. Therefore, the spring 17 operates the pilot valve 16 to effect the closing of the gate 15. After the plant has been shut down in this manner, it is necessary for the switch 5 to be moved into engagement with the contact 30 before it can be started up again from the remote point.

If, while the plant is in operation, an abnormal condition occurs whereby some of the contacts 25 are opened, the opening of these contacts opens the circuit of the holding coil 26 whereupon the pilot valve 16 is operated by the spring 17 to close the gate and shut down the plant. Since the contacts 25 are connected in the circuit of the starting coil 8 when the plant is shut down it is impossible to start the plant by means of the control switch 5 after such a shut down until the open contacts 25 have been manually reset.

While I have, in accordance with the patent statutes, shown and described my invention as applied to a particular system, and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is:—

1. In combination, an automatic station comprising a source of current and automatic control means therefore, a remote control station, a control circuit connecting said stations, an auxiliary source of current switching means at said remote control station for controlling the energization of said control circuit from said auxiliary source of current, electroresponsive means at said automatic station connected to said control circuit and arranged, when energized, to effect the operation of said automatic control means to start said automatic station and maintain it in operation, and means responsive to a predetermined condition of said automatic station for disconnecting said electroresponsive means from said auxiliary source and for completing another energizing circuit therefor which is independent of said auxiliary source.

2. In combination, an automatic prime mover dynamo electric plant, a remote control station therefor, an auxiliary source of current a control circuit extending between said plant and said station and including said auxiliary source of current, electroresponsive means at said plant connected to said control circuit when said plant is shut down and arranged when energized to effect the starting of said plant, switching means at said remote control station for controlling the energization of said control circuit, and means responsive to a predetermined electrical condition of said plant for disconnecting said electroresponsive means from said auxiliary source and completing another energizing circuit therefor which is independent of said auxiliary source.

3. In combination, an automatic prime mover dynamo electric plant comprising a prime mover and a dynamo electric machine arranged to be driven thereby, a remote control station for said plant, a control circuit extending between said plant and said station, an auxiliary source of current for said control circuit, electroresponsive means at said plant connected to said control circuit when said plant is shut down and arranged when energized to effect the starting of said plant, switching means at said remote control station for opening and closing said control circuit, contacts in the circuit of said electroresponsive means arranged to be opened in response to predetermined abnormal conditions of said plant, and means responsive to a predetermined electrical condition of said machine for disconnecting said electroresponsive means and contacts from said control circuit and source and for completing a circuit for said electroresponsive means and contacts across said machine.

4. A control system for a prime mover and a dynamo-electric machine driven thereby comprising a governor for the prime mover, electroresponsive means associated with said governor and having an operating coil arranged when energized to effect the starting of said prime mover, contacts arranged to be opened in response to abnormal conditions of said machine, a control circuit adapted to be completed for said operating coil and including said contacts, a holding coil for said electroresponsive means, and means responsive to the voltage of said machine for opening said control circuit and connecting said holding coil and said contacts in a circuit supplied by said machine.

5. A control system for a prime mover dynamo-electric plant comprising electroresponsive means arranged to control the starting and stopping of said plant, electroresponsive means arranged to vary the output of said plant, a control circuit arranged to be completed to energize both of said electroresponsive means to effect the starting of said plant, and means for energizing said first-mentioned electroresponsive means from said plant after said plant has been started whereby said control current may be opened and closed to control the operation of said second-mentioned electroresponsive means to vary the output of the plant without effecting the operation of said first-mentioned electroresponsive means to shut down the plant.

6. A control system for a prime mover dynamo-electric plant comprising a governor for the prime mover of the plant, electroresponsive means associated with the governor and arranged when energized to effect the starting of the prime mover, a synchronizing motor associated with said governor, a control circuit adapted to be completed to energize said electroresponsive means and said motor, contacts in the circuit of said electroresponsive means arranged to be opened in response to predetermined abnormal conditions of said plant, and means responsive to a predetermined electrical condition of the dynamo-electric machine for completing across said machine a circuit for said electroresponsive means which includes said contacts whereby said control circuit may be opened and closed to control said synchronizing motor without causing said electroresponsive means to effect the stopping of said prime mover.

7. A control system for a prime mover dynamo-electric plant comprising a governor for the prime mover of the plant, electroresponsive means associated with the governor having an operating coil arranged when energized to effect the starting of said prime mover, a source of current at a point remote from said plant, a synchronizing motor associated with said governor, a control circuit adapted to be completed to connect said operating coil and said synchronizing motor to said source, contacts in the circuit of said operating coil arranged to be opened in response to predetermined abnormal conditions of said plant, a holding coil for said electroresponsive means, and means responsive to the voltage of a dynamo-electric machine of said plant for effecting the opening of the circuit between said operating coil and said source and for effecting the completion of a circuit for said holding coil which includes said contacts and which is energized by the dynamo-electric machine of the plant.

8. The combination with an electrical translating device having a field-magnet winding, a generator for supplying energy to the field-magnet winding and automatic means for initiating and controlling the operation of the translating device, of a source of current for supplying energy to actuate the automatic means only when the generator is not in an energy-delivering condition.

9. The combination with an electrical translating device having a field-magnet winding, a generator for supplying energy to the field-magnet winding, automatic means for initiating and controlling the operation of the translating device and a source of current for supplying energy to actuate the automatic means when the generator is not in an energy-delivering condition, of means for automatically causing the generator to supply energy to actuate the automatic means when it is in an energy-delivering condition.

In witness whereof, I have hereunto set my hand this 13th day of August, 1924.

ELMER F. BLISS.